(12) United States Patent
Dukhedin-Lalla et al.

(10) Patent No.: US 7,666,379 B2
(45) Date of Patent: Feb. 23, 2010

(54) PROCESS AND APPARATUS FOR REMOVING BRONSTED ACID IMPURITIES IN BINARY HALIDES

(75) Inventors: Leisl Dukhedin-Lalla, Morristown, NJ (US); German Shekk, Bridgewater, NJ (US); John P. de Neufville, Mendham, NJ (US); Michael Pikulin, Bound Brook, NJ (US)

(73) Assignee: Voltaix, Inc., North Branch, NJ (US)

( * ) Notice: Subject to any disclaimer, the term of this patent is extended or adjusted under 35 U.S.C. 154(b) by 0 days.

(21) Appl. No.: 11/293,775

(22) Filed: Dec. 2, 2005

(65) Prior Publication Data

US 2006/0133986 A1 Jun. 22, 2006

Related U.S. Application Data

(63) Continuation of application No. 09/906,553, filed on Jul. 16, 2001, now abandoned.

(51) Int. Cl.
*C01B 33/10* (2006.01)
*B01D 53/04* (2006.01)
*B01D 53/68* (2006.01)

(52) U.S. Cl. ............... 423/341; 423/342; 423/489; 423/240 S; 423/230; 423/246; 423/248; 95/117; 95/131; 95/132; 95/139; 95/140

(58) Field of Classification Search ............... 423/240 S, 423/240 R, 341, 342, 488, 483, 489, 230, 423/246, 248; 95/117, 131, 132, 139, 140
See application file for complete search history.

(56) References Cited

U.S. PATENT DOCUMENTS

| | | | |
|---|---|---|---|
| 3,218,129 A | 11/1965 | Baker et al. | |
| 3,758,674 A | 9/1973 | Parish et al. | |
| 3,907,973 A | 9/1975 | Kidde | |
| 4,138,509 A | 2/1979 | Ingle et al. | |
| 4,157,376 A | 6/1979 | Vulikh | |
| 4,256,840 A | 3/1981 | Meitzner et al. | |
| 4,292,289 A | 9/1981 | Cannon et al. | |
| 4,292,344 A | 9/1981 | McHale | |
| 4,382,071 A | 5/1983 | Otsuka et al. | |
| 4,382,124 A | 5/1983 | Meitzner et al. | |

(Continued)

FOREIGN PATENT DOCUMENTS

JP 57135711 8/1982

(Continued)

OTHER PUBLICATIONS

The Merck Index, 1983, pp. 187, 630, 1060, 1061, 1221, 1402, Merck & Co., Inc., Rahway, New Jersey.

*Primary Examiner*—Ngoc-Yen M Nguyen
(74) *Attorney, Agent, or Firm*—Ryndak & Suri LLP (57) ABSTRACT

A process and apparatus is provided for the purification of binary halide fluid. The process and apparatus purifies the binary halide fluid by selectively removing Bronsted acid impurities and/or volatile oxygen containing impurities present in the binary halide. A regenerable adsorbent polymer is utilized to remove the Bronsted acid impurities from the binary halide fluid and a volatile oxide adsorbent having a specific adsorption capacity for the volatile oxide impurity is utilized to remove the volatile oxide from the binary halide when in gaseous form.

31 Claims, 4 Drawing Sheets

U.S. PATENT DOCUMENTS

| | | |
|---|---|---|
| 4,457,901 A | 7/1984 | Kitsugi et al. |
| 4,557,921 A | 12/1985 | Kirsch et al. |
| 4,615,872 A | 10/1986 | Porcham |
| 4,755,370 A | 7/1988 | Kray et al. |
| 4,784,840 A | 11/1988 | Gautreaux et al. |
| 4,900,530 A | 2/1990 | Anania et al. |
| 5,069,887 A | 12/1991 | Suenaga et al. |
| 5,075,092 A | 12/1991 | Boone |
| 5,165,907 A | 11/1992 | Chieng |
| 5,324,499 A | 6/1994 | Sturgeoff et al. |
| 5,688,477 A * | 11/1997 | Nel .................. 423/82 |
| 5,766,483 A | 6/1998 | Luly |
| 5,779,998 A | 7/1998 | Tom |
| 5,900,532 A | 5/1999 | Ikeda et al. |
| 2004/0184980 A1 * | 9/2004 | Atobe et al. ............ 423/342 |
| 2004/0255854 A1 * | 12/2004 | Sakai et al. ............ 118/715 |

FOREIGN PATENT DOCUMENTS

| | | |
|---|---|---|
| JP | 57156317 | 9/1982 |
| JP | 59050016 | 3/1984 |
| JP | 59162122 | 9/1984 |
| JP | 62143812 | 6/1987 |
| JP | 01051314 | 2/1989 |
| JP | 01052604 | 2/1989 |
| JP | 04175217 | 6/1992 |
| JP | 05078117 | 3/1993 |
| WO | WO03/006374 | 1/2003 |

* cited by examiner

PROCESS AND APPARATUS FOR REMOVING BRONSTED ACID IMPURITIES IN BINARY HALIDES

CROSS-REFERENCE TO RELATED APPLICATION

This application is a continuation of U.S. application Ser. No. 09/906,553, filed Jul. 16, 2001, now abandoned the entire disclosure of which is incorporated herein by reference.

FIELD OF THE INVENTION

The invention relates to a process and apparatus for the purification of binary halide fluid by removing Bronsted acid impurities present in the binary halide fluid. In one embodiment, the process and apparatus of the invention also relate to a process and apparatus for the removal of volatile oxygen-containing impurities present in the binary halide fluid.

BACKGROUND OF THE INVENTION

A need exists for various binary halide fluids having very low impurity levels. A need also exists for a process and apparatus that efficiently and economically purifies binary halide fluids by removing Bronsted acid impurities and volatile oxygen-containing impurities.

High purity binary halide fluids are commercially desirable. For example, fabrication of electronic components generally requires that the reagents used for deposition or etching of layers employed in the formation of the device have impurity levels which are very low such as below ten parts per million (ppm) calculated as mole percent, for example. In some applications, such as in Chemical Vapor Deposition, some constituents of the reagents must be present at levels that are even lower, such as no higher than in the parts per billion (ppb) range.

SUMMARY OF THE INVENTION

In accordance with one aspect of the present invention, a process and apparatus for removing Bronsted acid impurities present in a binary halide fluid is provided. The process includes contacting the binary halide fluid with a suitable regenerable adsorbent polymer to selectively remove at least a portion of the Bronsted acid impurities from the binary halide fluid, which impurities are retained by the polymer. The suitable regenerable adsorbent polymer has incorporated in its structure a moiety that results in a basicity of the polymer sufficient to adsorb the desired Bronsted acid when the fluid to be purified contacts the polymer. The polymer is typically regenerable, meaning at least a portion of the adsorbed material can be removed and the polymer reused. The basicity of the polymer can also be described in terms of the ionization constant, or pKa, of the polymer, whose value can be controlled by the repetitive incorporation of an appropriate pendant functional group or moiety attached to the polymer backbone. Preferably, the pKa of the polymer is substantially higher than that of the Bronsted acid being removed, such as on the order of a pKa value of 3 to 4.

In accordance with another aspect of the invention, the binary halide fluid contains a molecularly dispersed oxide impurity and the process further comprises contacting the binary halide fluid with a second adsorbent, said second adsorbent being characterized by an oxide moiety adsorption capacity greater than about 0.02 grams of oxide moiety per gram of adsorbent, to selectively remove at least a portion of an oxide impurity having a concentration of at least 5 parts per million on a volume basis from the binary halide fluid when the binary halide fluid is contacted with the second adsorbent. By "molecularly dispersed" is meant that the impurity is present as a dissolved liquid in the fluid where the fluid is a liquid and as a gaseous impurity where the fluid is in gaseous form. In each case, the impurity is not in a separate phase from the fluid binary halide.

In accordance with another aspect of the invention, the binary halide fluid is selected from $SiF_4$, $WF_6$, $BF_3$, $BCl_3$, $GeF_4$, $PF_3$, $PF_5$, $NF_3$, $SF_6$ and isotopically enriched binary halide fluids.

The volatile oxide impurity to be removed can include $CO_2$, $CO$, $H_2O$, oxides of nitrogen, oxides of sulfur, siloxanes, aldehydes, ketones, alcohols and mixtures thereof.

In one embodiment of the invention, the regenerable adsorbent polymer for use in removing Bronsted acid impurities is a copolymer of a monoethylenically unsaturated monomer and a vinylpyridine monomer.

In accordance with another aspect of the invention, the binary halide fluid is $SiF_4$ that is obtained as a byproduct from an industrial process. The industrial process may be, for example, the acidulation of phosphorus-containing rock and gypsum production as well as other sources of $SiF_4$ obtained as a byproduct. Thus, in accordance with the invention, the process includes purifying $SiF_4$ and the process further includes obtaining the $SiF_4$ as a byproduct from an industrial process.

In accordance with still another aspect of the invention, the regenerable adsorbent polymer for removal of Bronsted acid impurities is a polymer with a macroreticular structure. The polymer may incorporate pendant pyridine functional groups. In one aspect of the invention, the moiety incorporated into the repeating structure of the regenerable adsorbent polymer for removal of Bronsted acid impurities is selected from nitrogen heterocycles, amines, pyridines and pyrroles.

In accordance with another aspect of the invention, the adsorbent for removing volatile oxygen containing impurities from binary halide when in gaseous form is selected from zeolites, molecular sieves, metal oxides, mixed metal oxides and activated carbon. Typically, such materials have not been acid stabilized. In one embodiment, the adsorbent may be a synthetic zeolite with pores approximately 5 angstroms in diameter, hereinafter called 5A molecular sieves.

In accordance with still another aspect of the process, the process further includes regenerating the adsorbent regenerable polymer after it has absorbed a quantity of Bronsted acid impurities in accordance with the process of the invention. The adsorbent regenerable polymer typically may be regenerated by heating the polymer, for example, under a vacuum or in the presence of a flowing stream of an inert fluid. The polymer can be reused in the process after regeneration providing an economical means for impurities removal.

In accordance with another aspect of the invention, the process removes hydrochloric acid and/or hydrofluoric acid present as impurities in silicon tetrafluoride fluid and produces electronic grade silicon tetrafluoride. For example, the process includes contacting the impurity containing silicon tetrafluoride fluid with a suitable adsorbent polymer that adsorbs hydrochloric acid. The polymer has incorporated in its chemical structure a moiety that increases the basicity of the polymer relative to hydrochloric acid to cause it to selectively remove at least a portion of the hydrochloric acid from the silicon tetrafluoride fluid.

In accordance with another aspect of that process, the silicon tetrafluoride contains a volatile oxide impurity and the process further comprises contacting the silicon tetrafluoride in gaseous form with a second adsorbent. The second adsorbent is characterized by a volatile oxide moiety adsorption capacity for the volatile oxide impurity of typically 0.02 grams of volatile oxide per gram of adsorbent to remove a volatile oxide impurity, having a concentration of at least 5 ppmv, when exposed to the adsorbent to selectively remove at least a portion of the volatile oxide impurity in the silicon tetrafluoride when in gaseous form.

The polymer for removal of Bronsted acid impurities may be as previously described, such as a copolymer of a monoethylenically unsaturated monomer and a vinylpyridine monomer, which may also have a macroreticular structure. The polymer may or may not be regenerable in accordance with this aspect of the invention. Also, in accordance with this aspect of the invention, the process of purifying silicon tetrafluoride fluid results in excess of 99.5% on a molar basis of the silicon tetrafluoride fluid processed being recovered as purified silicon tetrafluoride fluid.

In accordance with one embodiment of the present invention, a macroreticular polymer incorporating an organic base pendant functional group which is utilized to provide the basicity of the adsorbent appropriate to the requirements of the fluid sample being purified by selecting the chemical nature of the base incorporated into the polymer.

Another aspect of the present invention is to provide a process by which a byproduct stream of an industrial process can be utilized to yield a component of that byproduct stream having electronic grade purity.

Still another aspect of the present invention is to provide a process by which the concentrations of several Bronsted acid components are decreased in a fluid sample of a binary halide fluid having several volatile Bronsted acid components with significantly different concentrations and similar chemical properties.

Another aspect of this invention is to provide a process whereby the byproduct of an industrial process providing a feedstock used as a source of silicon tetrafluoride may be purified to a level acceptable for use in electronic component manufacturing without the requirement of synthesizing and thermally decomposing a solid ternary compound containing silicon tetrafluoride.

Another aspect of this invention is to provide a process whereby the removal of Bronsted acids from the industrial byproduct stream provides a feedstock for silane and polysilicon production where the corrosion potential of the feedstock is greatly reduced and the consumption of raw materials by the Bronsted acid contaminants is also reduced. Any suitable process for producing silane and/or polysilicon that includes reacting the purified $SiF_4$ can be used in accordance with the invention. Typically, the $SiF_4$ is reacted with a metal hydride in the presence of a solvent. More particularly, silane can be made from $SiF_4$ in accordance with the method described in U.S. Pat. No. 5,075,092, the disclosure of which is hereby incorporated by reference. Production of polysilicon from silane produced from silicon tetrafluoride purified in accordance with the purification aspects of the invention can also be done using any suitable method of producing polysilicon from silane produced from purified $SiF_4$. Suitable methods for production of polysilicon from silane are described in U.S. Pat. Nos. 4,292,344 and 4,784,840, the disclosures of which are hereby incorporated by reference.

Another aspect of this invention is to provide an apparatus in which the concentrations of contaminants in tetrafluorosilane fluid are reduced from a high level to a level where a final product can be prepared for use in electronic component manufacturing. Such an apparatus can be used as a means of purifying crude silicon tetrafluoride fluid or as a means of controlling contaminants in electronic grade $SiF_4$ at the point of use. As used herein, electronic grade in general, and in particular for $SiF_4$, typically means a purity of at least 99.99% on a volume basis. In addition to at least 99.99% purity, electronic grade $SiF_4$ also has the following typical specifications on a ppm volume basis of no more than:

50 ppm HF
10 ppm $CH_4$
3 ppm $N_2$
1 ppm $CO_2$
1 ppm $O_2$+Ar
0.5 ppm CO
0.5 ppm As
0.5 ppm P
0.5 ppm B Another aspect of this invention is the separation of a volatile Bronsted acid from a volatile binary halide in a sample in which the Bronsted acid is a minor component of a fluid (i.e., a liquid or a gas) and the binary halide is a major component of the fluid, thereby reducing the concentration of the Bronsted acid component or impurity present in the binary halide fluid.

In accordance with another aspect of the invention, an apparatus for purifying a binary halide fluid by removing Bronsted acid impurities or Bronsted acid and volatile oxygen containing impurities is provided. In accordance with one embodiment, the apparatus includes a chamber having an inlet and an outlet for passage of binary halide fluid containing impurities therethrough. The chamber will contain a regenerable adsorbent polymer for removing Bronsted acid impurities and it may contain a volatile oxide adsorbent. The regenerable adsorbent polymer contained within the chamber has incorporated in its structure a moiety that increases the basicity of the polymer relative to the Bronsted acid to be removed, for selectively removing at least a portion of the Bronsted acid impurities from the binary halide fluid passed therethrough by contact of the binary halide fluid with the regenerable adsorbent polymer, which impurities are selectively retained by the polymer. The chamber is configured such that a binary halide fluid passed into the chamber through the inlet must contact the regenerable adsorbent polymer and, optionally, the second adsorbent prior to exiting the chamber through the outlet. Preferably, the adsorbent materials are contained within the chamber such that the adsorbed impurities are retained within the chamber when the binary halide fluid is passed therethrough. The second adsorbent when contained within the chamber is characterized by an oxide moiety impurity adsorption capacity of typically 0.02 grams of oxide impurity per gram of adsorbent to remove a molecularly dispersed oxide impurity, having a concentration of at least 5 ppmv, when exposed to the adsorbent to selectively remove at least a portion of the molecularly dispersed oxide impurity in the binary halide fluid.

If desired, the fluid may be passed through multiple chambers having the same or a different adsorbent.

In accordance with another aspect of the apparatus in accordance with the invention, the regenerable adsorbent polymer is a copolymer of a monoethylenically unsaturated monomer in a vinylpyridine monomer.

In accordance with another aspect of the apparatus in accordance with the invention, the apparatus further comprises binary halide fluid contained in the chamber. The binary halide fluid can be $SiF_4$ or isotopically enriched silicon tetrafluoride and the $SiF_4$ may be obtained as a byproduct from an industrial process.

In accordance with another aspect of the invention, the regenerable adsorbent polymer is a polymer with a macroreticular structure. The polymer may incorporate pendant pyridine functional groups.

In accordance with another aspect of the invention, an apparatus for purifying binary halide fluid is provided in which first and second chambers are provided, each of the chambers having an inlet and an outlet for passing binary halide fluid therethrough. The first chamber contains a regenerable adsorbent polymer in a manner such that binary halide fluid passing through the first chamber contacts the polymer and the polymer is retained in the first chamber. The regenerable adsorbent polymer has incorporated in its structure a moiety that increases the basicity of the polymer relative to the Bronsted acid to be removed, for selectively removing at least a portion of the Bronsted acid impurities from the binary halide fluid by contacting the fluid and the polymer, which impurities are selectively retained by the polymer. A transfer conduit connects the outlet of the first chamber to the inlet of the second chamber. The second chamber contains an oxide adsorbent being characterized by a molecularly dispersed oxide moiety adsorption capacity of typically 0.02 grams of impurity oxide per gram of adsorbent to remove a molecularly dispersed oxide impurity, having a concentration of at least 5 ppmv, when exposed to the adsorbent to selectively remove at least a portion of the molecularly dispersed oxide impurity in the binary halide fluid. Depending on the nature of the binary halide fluid to be purified, the nature of the Bronsted acid impurities to be removed, and the nature of the molecularly dispersed oxide impurities to be removed, the impure fluid may flow through the two chambers in either sequence.

A binary halide fluid recovery device may be provided in communication with the outlet of the second chamber so that binary halide fluid exiting the second chamber outlet is retrieved for further use. The recovery device may be a tank or other storage vessel.

As used herein, the term "fluid" includes gas(es) and liquid (s).

DETAILED DESCRIPTION OF THE INVENTION

In accordance with the present invention, a process and apparatus for removing Bronsted acid impurities present in a binary halide fluid (gas or liquid) is provided. The process includes contacting the binary halide fluid (gas or liquid) with a suitable adsorbent polymer. Typically, the suitable polymer will be a regenerable adsorbent polymer, having incorporated into its structure a moiety that increases the basicity of the polymer relative to the Bronsted acid to be removed, to cause the polymer to selectively remove (typically by adsorption) at least a portion of the Bronsted acid impurities from the fluid (gas or liquid), which impurities are retained by the polymer.

In accordance with another aspect of the invention, the binary halide also contains an oxide impurity and the purification process of the invention is composed of contacting the binary halide with an adsorbent characterized by a volatile oxide moiety adsorption capacity of typically 0.02 grams of impurity oxide per gram of adsorbent to remove a molecularly dispersed oxide impurity having a concentration of at least 5 ppmv, when exposed to the adsorbent to selectively remove at least a portion of the molecularly dispersed oxide impurity from the binary halide fluid.

Preferably, the Bronsted acid adsorbent of the present invention is of high surface area for its superficial volume (high specific surface area), and preferably contains at most low levels of the materials to which semiconductor manufacturing is particularly sensitive and is inert in the environment in which it is used. Polymers having macroreticular structure such as those disclosed in U.S. Pat. No. 4,256,840 are useful in accordance with the invention. Such polymers can be tailored to adjust the structure of the macrocells without affecting the gross structure of the polymer and provide high specific surface area, low resistance to fluid flow, and the ability to independently alter the chemical environment in the polymer without affecting the intrinsic robustness of the polymer. These materials also can be in general inert to attack by a wide variety of Lewis and Bronsted acids encountered in the reagent streams with which they are to be contacted. They are the preferred Bronsted acid adsorbent of the present invention. Such polymers are commercially available and produced by Reilly Industries Inc. and sold under the name Reillex™ HP. This has a pyridine moiety incorporated therein and was found to reversibly adsorb Bronsted acids such as hydrochloric acid.

Any suitable base can be incorporated into the polymer to perform the desired Bronsted acid impurity removal. Suitable bases include organic bases that may be selected from nitrogen heterocycles, amines, pyridines and pyrroles. Such an organic base can be incorporated into the polymer as a repeating polymer moiety formed by copolymerizing a monoethylenically unsaturated monomer and a monomer containing an organic base moiety, having a basicity higher than the Bronsted acid to be removed.

By way of example, Reillex™ HP, a copolymer that is the product of copolymerization of a monoethylenically unsaturated monomer and at least one monovinylidene monomer, wherein at least one of the monovinylidene monomers chosen is vinylpyridine, polymerized under conditions in which the product exhibits a macroreticular structure was chosen. The adsorbed material was found to be liberated from the adsorbent with gentle heating and purging of the material with an inert fluid. This material, hereinafter referred to as the test adsorbent, was employed in a series of experiments that demonstrate the present invention.

Figure 1:
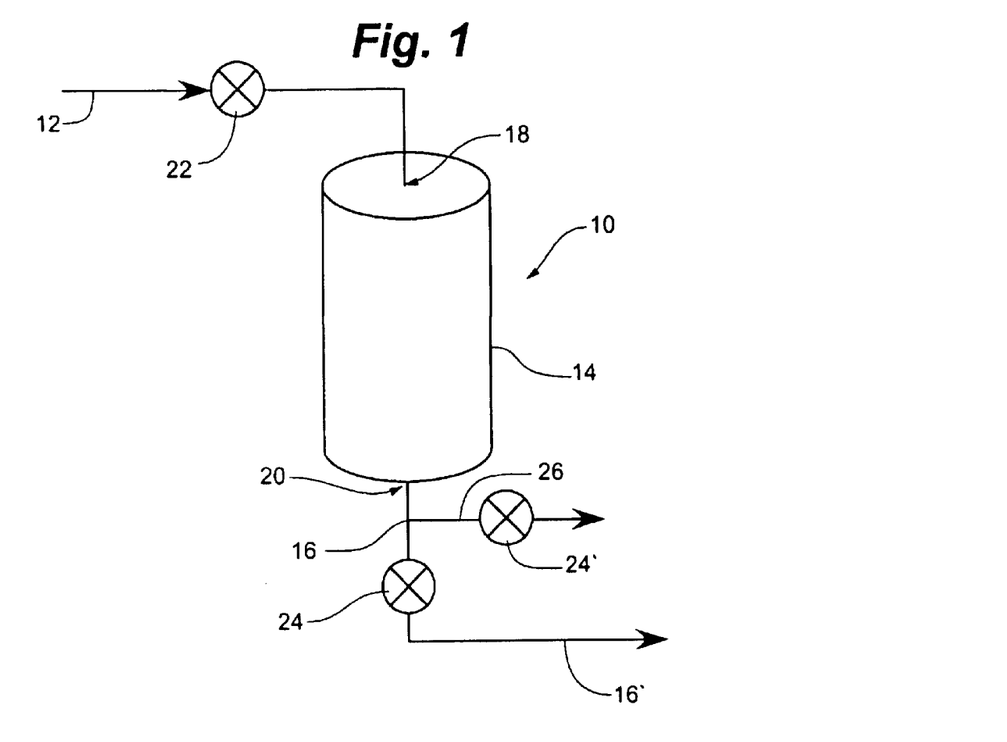
FIG. 1 is a schematic illustration of an apparatus in accordance with the invention.
Figure 2:
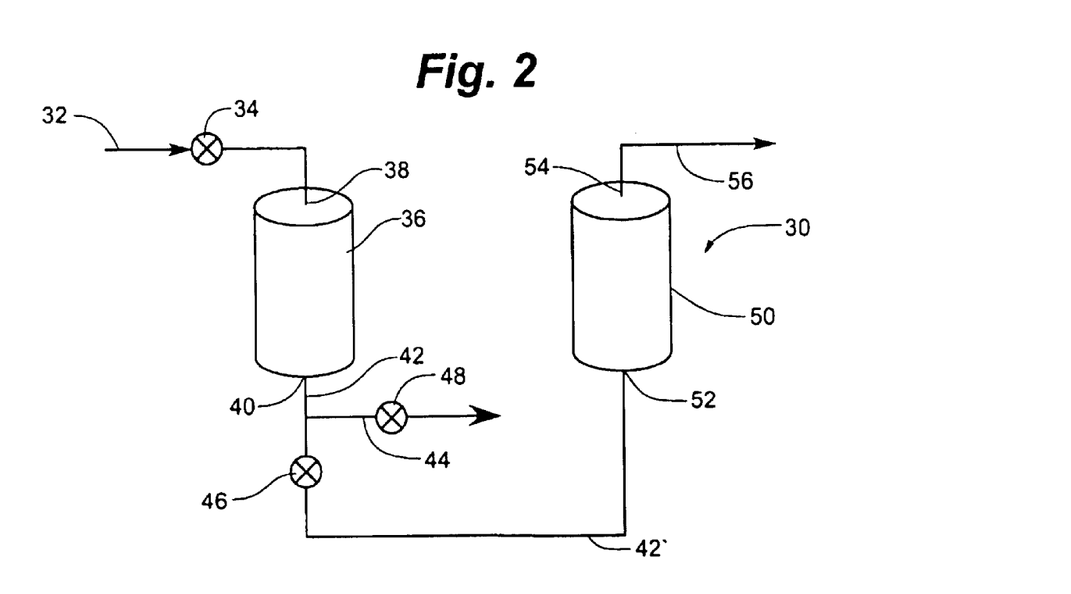
FIG. 2 is a schematic illustration of another apparatus in accordance with the invention.
Figure 3:
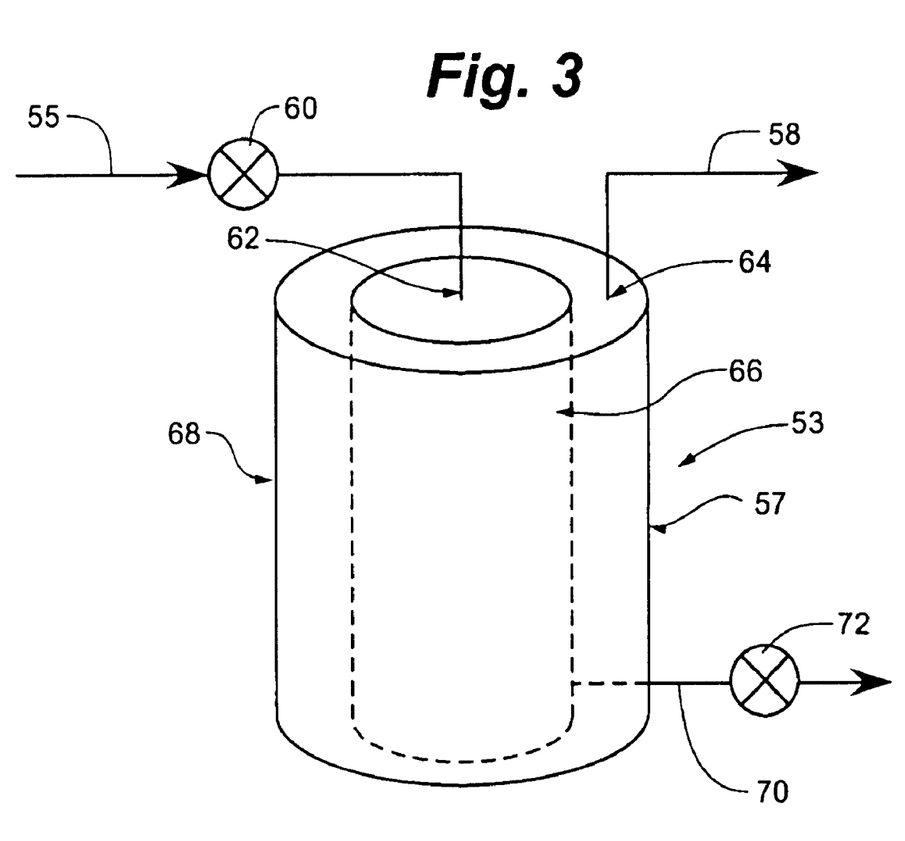
FIG. 3 is a schematic illustration of still another apparatus in accordance with the invention.

Referring to FIGS. 1, 2 and 3 generally, there are illustrated various embodiments of apparatus in accordance with the invention for purifying a binary halide fluid by removing a Bronsted acid and/or molecularly dispersed oxygen containing impurities.

Referring to FIG. 1, there is illustrated an apparatus 10 in accordance with the invention. Apparatus 10 includes an inlet stream 12, a chamber 14 and an outlet stream 16.

Chamber 14 includes an inlet 18 and an outlet 20. Inlet stream 12 may include suitable valving 22 to selectively open and close inlet stream 12. Similarly, outlet stream 16 may include suitable valving 24 and 24'. Outlet stream 16 is shown being split into a main stream 16' and a sampling stream 26 having valves 24 and 24', respectively, to open and/or close those streams, as desired. Regenerable adsorbent polymer (not shown) as previously described for adsorbing the Bronsted acid to be removed is contained within chamber 14. The adsorbent polymer is located within chamber 14 such that the binary halide fluid that enters chamber 14 via stream 12 will contact the regenerable adsorbent polymer to remove Bronsted acid impurities therefrom. The impurities are retained by the polymer which, in turn, is contained within chamber 14 even when the binary halide fluid passes through chamber 14. Any suitable structure known in the art can be utilized to retain the adsorbent polymer therein, such as baffles or a screen, for example. Chamber 14 may also include in addition to the regenerable adsorbent polymer a second oxide adsorbent that is different from the regenerable polymer adsorbent. The second oxide adsorbent has an affinity for oxygen containing impurities as desired and typically will be characterized by having an impurity oxide moiety adsorption capacity for the molecularly dispersed oxide impurity to be removed of typically 0.02 grams of impurity oxide per gram of adsorbent to remove a molecularly dispersed oxide impurity, having a concentration of at least 5 ppmv, when exposed to the adsorbent to selectively remove at least a portion of the molecularly dispersed oxide impurity in the binary halide fluid.

The second oxide adsorbent may be disposed within chamber 14 such that the binary halide first contacts the regenerable adsorbent polymer and thereafter contacts the molecularly dispersed oxide adsorbent or vice versa. Alternatively, the binary halide gas may contact both types of adsorbents simultaneously.

Referring to FIG. 2, there is an alternative embodiment of an apparatus in accordance with the invention. Apparatus 30 of FIG. 2 for purifying a binary halide fluid by removing a Bronsted acid and oxygen containing impurities is composed of an inlet stream 32 having a valve 34 which can be selectively opened and closed, a first chamber 36 having an inlet 38 and an outlet 40. Outlet stream 42 communicates with outlet 40 of chamber 36 and is split into a main outlet stream 42' and a sampling stream 44. Those streams may have suitable valving or valves 46 and 48, respectively, in order to selectively close or open either or both of those streams either fully or partially.

Outlet stream 42' forms the inlet stream of a second chamber 50 that includes an inlet 52 and an outlet 54. Outlet 54 has a stream 56 that contains the purified binary halide fluid.

First chamber 36 typically will contain the regenerable adsorbent polymer as previously described and is contained within first chamber 36 such that it is retained therein during and after passage of the binary halide fluid therethrough.

Similarly, second chamber 50 will contain an impurity oxide adsorbent, which typically will be different from the regenerable polymer adsorbent. The impurity oxide adsorbent (not shown) contained within chamber 50 is as previously described. The order in which chambers 36 and 50 are arranged is not critical.

A third embodiment of an apparatus in accordance with the invention is illustrated in FIG. 3. Apparatus 53 includes an inlet stream 55, a chamber 57 and an outlet stream 58.

Inlet stream 55 has a suitable valve or other flow control apparatus 60 for opening or closing, either partially or completely inlet stream 55.

Chamber 57 includes an inlet 62 and an outlet 64. Chamber 57 also includes a first subchamber 66 that can contain one of the two adsorbents utilized, such as the regenerable adsorbent polymer and a second subchamber 68 for containing the other adsorbent material. Subchambers 66 and 68 may be generally concentric. The binary halide fluid to be purified enters through inlet stream 55 through inlet 62 of chamber 57 that causes the binary halide fluid to enter into the top of subchamber 66 where the Bronsted acid impurity is removed. The binary halide fluid then exits through the bottom of subchamber 66 and into the bottom of subchamber 68, which may contain the impurity oxide adsorbent. After passage therethrough, the purified binary halide exits through outlet 64 of subchamber 68 and into outlet stream 58. A sampling stream 70 and associated valve 72 may be provided to obtain a sample of the binary halide after treatment with the adsorbent contained in first subchamber 66.

EXAMPLE 1

In the first example, a sample of the test adsorbent was prepared for use as a scavenger of acid gases by placing it in an oven and heating it at 100° C. under the laboratory atmospheric conditions. Reillex™ HP was selected as a suitable adsorbent for the purposes of this test. The sample was periodically weighed. Heating was continued until no further weight loss was observed. The duration of this heating was about 6 hours in this case.

A quantity of the pre-dried material was placed into a chamber having an inlet and an outlet, and being arranged such that a gas sample introduced to the inlet must impinge the whole of the mass of the test adsorbent before it can exit the chamber through the outlet. The test chamber was evacuated to a pressure of approximately 20 milli-Torr. Evacuation was continued with continued heating of the test chamber, and thereby heating of the test adsorbent. The test adsorbent was heated to a temperature of about 40-50° C. Heating of the test adsorbent under vacuum was continued until no further evolution of gas could be detected from the test adsorbent. Evolution of gas from the test adsorbent was determined by periodically closing the test chamber to the vacuum source and observing the pressure rise over the base pressure attained by the vacuum system.

When no pressure rise was observed over 2 minutes, the test chamber was sealed off from the vacuum system and purged with a stream of He while the test adsorbent was cooled to room temperature. The helium used to purge the test adsorbent had a purity of 99.9999% as that purity is defined in the pure gas industry.

When the test adsorbent had attained room temperature (approximately 25° C.) the helium purge gas was discontinued and a stream containing $SiF_4$ having an impurity level of 11,000 ppm HCl and 300 ppm $CO_2$ was passed into the test chamber. The gas leaving the test chamber was sampled and the sample was examined using an FTIR spectrometer. The result is shown in FIG. 4.

Figure 4:
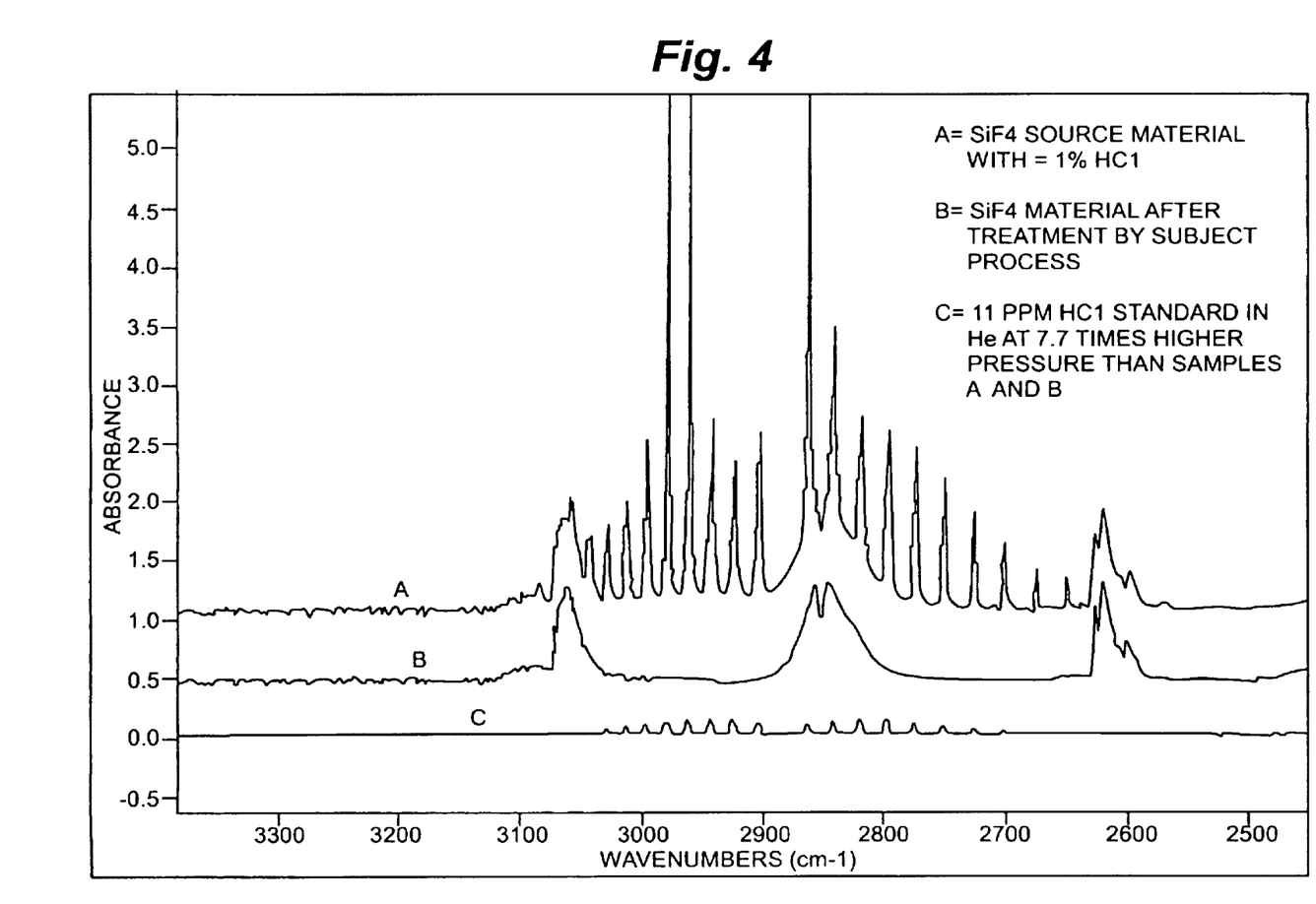
FIG. 4 is an FTIR spectrum of a silicon tetrafluoride gas sample showing 1.1% (11,000 ppm) HCl in the source material, nondetectable HCl in the treated material and an 11 ppm HCl standard.

With reference to FIG. 4 which has the traces of the impure $SiF_4$, the $SiF_4$ emerging from the test chamber, and an $SiF_4$ standard having a concentration of 10 ppm HCl shows that the concentration of HCl was reduced to a level significantly below 10 ppm, and the impure $SiF_4$ gas processed in the test bed had attained a level of HCl impurity commensurate with that of the reagent purified to levels suitable for semiconductor fabrication.

The flow of impure $SiF_4$ was continued through the test material until the level of HCl detected in the outlet reached a level of 10 ppm. Calculations based on the volume of gas that had passed through the test adsorbent indicated that the test adsorbent had taken up 450 mg of HCl/g of test adsorbent placed into the test chamber. This is found to be the gross capacity of the test adsorbent for HCl uptake.

EXAMPLE II

In a separate experiment, a 35-gram sample of test adsorbent prepared as described in Example I was placed in a 1.27 cm tube forming a column of test adsorbent 2 feet long. An impure sample of $SiF_4$ having the same composition as that used in Example I was passed through the bed of test adsorbent at a flow rate of 28.32 liters/hour, giving a residence time on the bed of test adsorbent of approximately 14.8 seconds. Even under these conditions the same results for test adsorbent HCl capacity and purity in the effluent test gas were observed.

Figure 5:
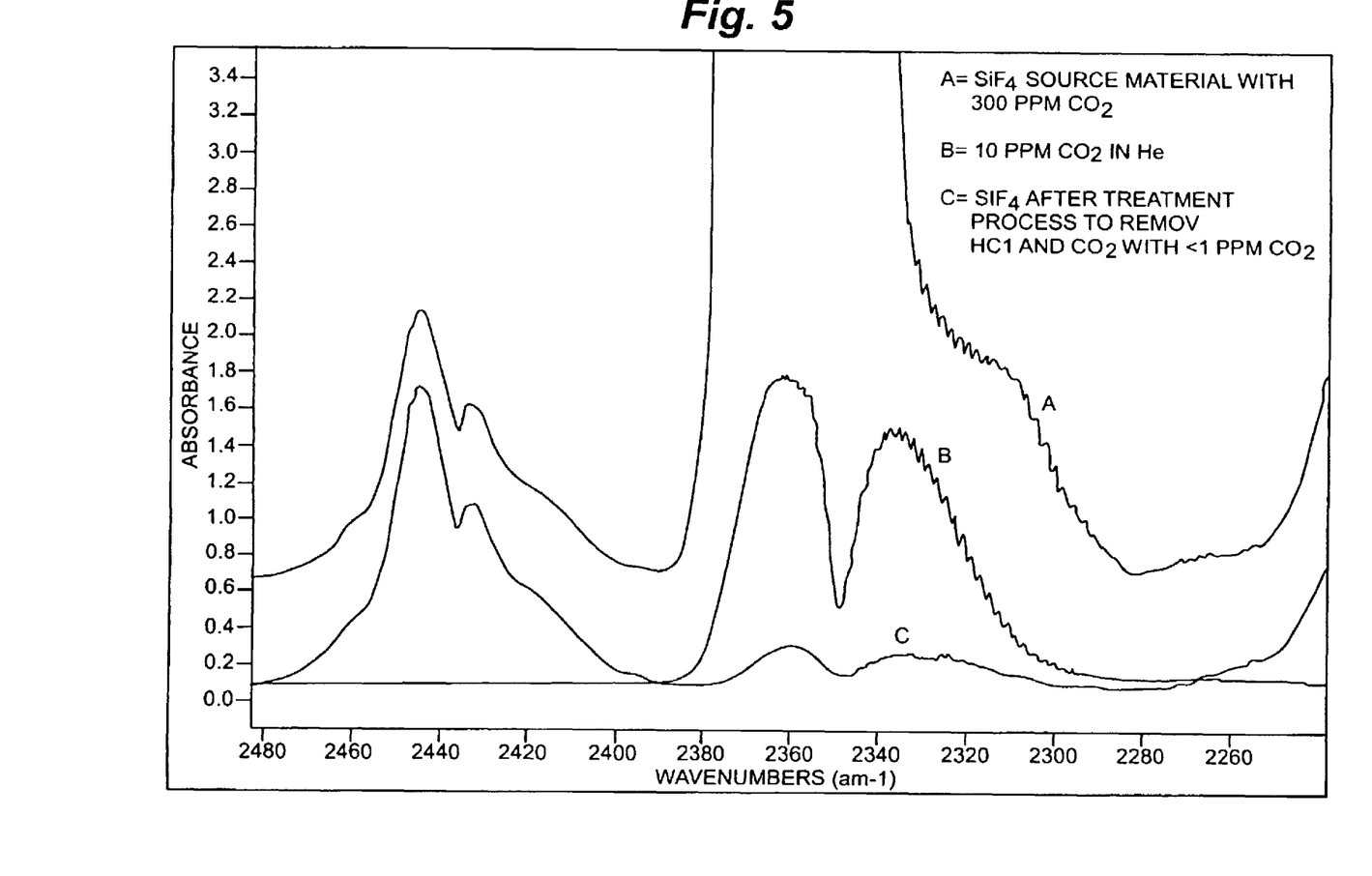
FIG. 5 is an FTIR spectrum of silicon tetrafluoride gas showing 300 ppm $CO_2$ in the source material, less than 1 ppm $CO_2$ in the treated material and a 10 ppm $CO_2$ standard.

Continuing the purification, 1500 g of the $SiF_4$ effluent gas was collected in a 30-liter vessel placed in a liquid nitrogen bath. The collection vessel, which also contained 2.27 kg 5A molecular sieves had been prepared by evacuating the vessel containing the mole sieves to a vacuum of 200 milli-Torr. The vessel and mole sieves were then heated to 50 degrees for 3 hours with continued evacuation. The vessel was refilled with He purified to 99.99% purity, as that purity level is defined by the pure gas industry and the vessel and mole sieve were cooled to room temperature under a helium atmosphere. Prior to being collected in the 30-liter vessel, the $SiF_4$ contained 300 ppm $CO_2$ as determined by FTIR analysis. The vessel was sealed, brought to room temperature and left to sit for 16 hours at room temperature. At the end of 16 hours the gas was sampled and analyzed by FTIR and found to contain less than 1 ppm $CO_2$ as compared with a standard having 10 ppm $CO_2$ in helium by FTIR. With reference to FIG. 5, FTIR spectra showing the comparison of the $CO_2$ levels in the test $SiF_4$ before and after this treatment with a standard having a 10 ppm $CO_2$ level are shown. It can be seen that this treatment was effective in removing $CO_2$.

EXAMPLE III

Example II was repeated using the same test adsorbent that was subjected to regeneration after exhaustion. The test adsorbent was regenerated by purging with nitrogen purified to a level of 99.99% as that purity level is defined by those working in the pure gas industry for 2 hours at room temperature at a rate of 15 scfh. It was then evacuated to 20 milli-Torr and heated to a temperature of between 40-50° C. for a period of 6 hours.

Following the heating period, the test adsorbent was cooled under a stream of helium as for the preparation of the test adsorbent described for Example I. The regenerated test adsorbent was then exposed to an $SiF_4$ containing the same level of contaminants as described above under the flow conditions of Example II. Analysis of the effluent from the test chamber showed that HCl was removed to a level below detection. The experiment was continued until the level of HCl in the effluent reached 10 ppm. The regenerated column displayed the same capacity for HCl scavenging that was observed in the first determination, showing that it had lost none of its capacity during regeneration or in carrying out the previous experiment. A 1500 g sample of the $SiF_4$ effluent gas from the regenerated test bed was again passed into the same mole sieve container used in the first experiment after it had been purged of the previous $SiF_4$ sample, but without additional preparative treatment. The $SiF_4$ admitted to the vessel containing mole sieves had 300 ppm of $CO_2$ contamination, as in the previous experiment. The vessel was again sealed and left to warm to room temperature. The vessel was left to stand for 16 hours. After 16 hours a sample of this material had less than 1 ppm of $CO_2$ contamination as determined by FTIR spectroscopy.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A process for purifying a silicon tetrafluoride fluid including removing Bronsted acid present as an impurity in the silicon tetrafluoride fluid, the process comprising:
   contacting the impurity containing silicon tetrafluoride fluid with an adsorbent polymer having incorporated in its chemical structure a moiety having a basicity so that when incorporated into the polymer the polymer is capable of adsorbing the Bronsted acid impurity to remove at least a portion of the Bronsted acid impurity from the silicon tetrafluoride fluid to produce a purified silicon tetrafluoride fluid, wherein the purified silicon tetrafluoride fluid is electronic grade, wherein the electronic grade is at least 99.99% silicon tetrafluoride on a volume basis, and the Bronsted acid impurity adsorbed comprises hydrochloric acid.

2. The process of claim 1 wherein the process includes obtaining the $SiF_4$ as a byproduct from an industrial process.

3. The process of claim 1 wherein the silicon tetrafluoride fluid contains silicon tetrafluoride in gaseous form and a volatile oxide impurity and the process for purifying the silicon tetrafluoride fluid further comprises contacting the silicon tetrafluoride in gaseous form with a second adsorbent, said second adsorbent being characterized by an oxide impurity adsorption capacity for the oxide impurity of greater than about 0.02 grams of an oxide per gram of adsorbent to remove a molecularly dispersed oxide impurity having a concentration of at least 5 ppmv, when exposed to the adsorbent to selectively remove at least a portion of the volatile oxide impurity in the silicon tetrafluoride and produce the purified electronic grade silicon tetrafluoride fluid.

4. The process of claim 1 wherein the polymer is a copolymer of a monoethylenically unsaturated monomer and a vinylpyridine monomer.

5. The process of claim 1 wherein said adsorbent polymer is a polymer with a macroreticular structure.

6. The process of claim 1 wherein said polymer incorporates pendant pyridine functional groups.

7. The process of claim 1 wherein the moiety is selected from the group consisting of nitrogen heterocycles, amines, pyridines, and pyrroles.

8. The process of claim 3 wherein the contacting of the silicon tetrafluoride fluid with the second adsorbent occurs after the contacting with the regenerable adsorbent polymer and wherein said second adsorbent is not acid-stabilized and is selected from the group consisting of zeolites, molecular sieves, metal oxides, and mixed metal oxides.

9. The process of claim 8 wherein said second adsorbent is comprised of 5A molecular sieve.

10. The process of claim 1 wherein the polymer is regenerable and the process further comprises:
    regenerating the regenerable adsorbent polymer after it has adsorbed a quantity of hydrochloric acid; and
    re-using the polymer in the process of claim 1 after regenerating the polymer.

11. The process of claim 10 wherein the polymer is regenerated by treatment selected from the group consisting of heating the polymer, subjecting the polymer to reduced pressure and combinations thereof.

12. The process of claim 1 wherein in excess of 99.5 mole percent of the $SiF_4$ processed is recovered as purified $SiF_4$.

13. The process of claim 1 wherein the silicon tetrafluoride fluid comprises a volatile oxide impurity selected from the group consisting of $CO_2$, CO, oxides of nitrogen, oxides of sulfur, siloxanes, aldehydes, ketones, alcohols, and mixtures thereof.

14. The process of claim 1 wherein more than 99% of the hydrochloric acid in said silicon tetrafluoride fluid is removed by said contacting.

15. The process of claim 14 wherein the concentration of hydrochloric acid in said silicon tetrafluoride fluid after said contacting is less than 10 ppm.

16. A process for purifying a silicon tetrafluoride fluid including removing a Bronsted acid impurity from the fluid, the process comprising:
provid­ing a silicon tetrafluoride fluid consisting essentially of silicon tetrafluoride, a Bronsted acid, and optionally a volatile oxide impurity selected from the group consisting of $CO_2$, CO, oxides of nitrogen, oxides of sulfur, siloxanes, aldehydes, ketones, alcohols, and mixtures thereof;
contacting the silicon tetrafluoride fluid with an adsorbent polymer, having incorporated in its structure a moiety having a basicity so that when incorporated into the polymer, the polymer is capable of adsorbing and retaining the Bronsted acid to remove at least a portion of the Bronsted acid impurity from the silicon tetrafluoride fluid to produce a purified silicon tetrafluoride fluid,
wherein the Bronsted acid comprises HCl and said purified silicon tetrafluoride fluid is electronic grade, wherein the electronic grade is at least 99.99% silicon tetrafluoride on a volume basis.

17. The process of claim 16 wherein the purified silicon tetrafluoride fluid is at least 99.99% pure on a volume basis after said contacting.

18. The process of claim 16 wherein said adsorbent polymer is a polymer with a macroreticular structure and said polymer incorporates pendant pyridine functional groups.

19. The process of claim 16 wherein the removal of at least a portion of the Bronsted acid impurity from the silicon tetrafluoride fluid is selective.

20. A process for purifying a silicon tetrafluoride fluid including the removal of hydrochloric and hydrofluoric acid impurities present in the silicon tetrafluoride fluid, the process comprising:
contacting an impurity containing silicon tetrafluoride fluid with a regenerable adsorbent polymer, having incorporated in its structure a moiety having a basicity so that when incorporated into the polymer, the polymer is capable of adsorbing and retaining hydrochloric and hydrofluoric acid to remove at least a portion of the hydrochloric and hydrofluoric acid impurities from the silicon tetrafluoride fluid to produce a purified silicon tetrafluoride fluid,
wherein said purified silicon tetrafluoride fluid is electronic grade, wherein the electronic grade is at least 99.99% silicon tetrafluoride on a volume basis.

21. The process of claim 20 further comprising providing the silicon tetrafluoride fluid contains silicon fluoride in gaseous form for contacting, the silicon tetrafluoride fluid consisting essentially of silicon tetrafluoride, hydrochloric acid, hydrofluoric acid and optionally a volatile oxide impurity selected from the group consisting of $CO_2$, CO, oxides of nitrogen, oxides of sulfur, siloxanes, aldehydes, ketones, alcohols, and mixtures thereof, and the process optionally further comprises contacting the silicon tetrafluoride in gaseous form with a second adsorbent, said second adsorbent being characterized by an oxide impurity adsorption capacity for the oxide impurity of greater than about 0.02 grams of an oxide per gram of adsorbent to remove a molecularly dispersed oxide impurity having a concentration of at least 5 ppmv, when exposed to the adsorbent to selectively remove at least a portion of the volatile oxide impurity in the silicon tetrafluoride and produce the purified electronic grade silicon tetrafluoride fluid.

22. The process of claim 20 wherein the process for removing hydrochloric and hydrofluoric acid consists essentially of the contacting.

23. The process of claim 22 wherein the silicon tetrafluoride fluid is in gaseous form and the process for purifying the silicon tetrafluoride fluid further comprises contacting the silicon tetrafluoride fluid in gaseous form with a second adsorbent, the silicon tetrafluoride fluid further comprising a molecularly dispersed oxide impurity, the second adsorbent being characterized by an oxide impurity adsorption capacity for the oxide impurity of greater than about 0.02 grams of an oxide per gram of adsorbent to remove the molecularly dispersed oxide impurity having a concentration of at least 5 ppmv, when exposed to the adsorbent to selectively remove at least a portion of the molecularly dispersed oxide impurity in the silicon tetrafluoride fluid and produce the purified electronic grade silicon tetrafluoride.

24. The process of claim 20 wherein the polymer is regenerable and the process further comprises:
regenerating the regenerable adsorbent polymer after it has adsorbed a quantity of hydrochloric and hydrofluoric acid; and
re-using the polymer in the process of claim 20 after regenerating the polymer.

25. The process of claim 20 wherein the contacting reduces the concentration of hydrofluoric acid in the silicon tetrafluoride fluid to 50 ppm or below.

26. The process of claim 1 wherein the Bronsted acid impurity adsorbed further comprises hydrofluoric acid.

27. The process of claim 26 wherein the contacting reduces the concentration of hydrofluoric acid in the silicon tetrafluoride fluid to 50 ppm or below.

28. The process of claim 26 wherein the process consists essentially of the contacting.

29. The process of claim 16 wherein the Bronsted acid impurity reduced by the contacting further comprises hydrofluoric acid.

30. The process of claim 29 wherein the contacting reduces the concentration of hydrofluoric acid in the silicon tetrafluoride fluid to 50 ppm or below.

31. The process of claim 29 wherein the process consists essentially of the contacting.

* * * * *